(12) United States Patent
Nourbakhsh et al.

(10) Patent No.: US 6,952,732 B2
(45) Date of Patent: Oct. 4, 2005

(54) METHOD AND APPARATUS FOR MULTI-CONTACT SCHEDULING

(75) Inventors: Illah Nourbakhsh, Pittsburgh, PA (US); Ofer Matan, Palo Alto, CA (US); Jason Fama, Mountain View, CA (US); Scott Veach, Los Angeles, CA (US); Edward Hamilton, Los Gatos, CA (US); Alex Fukunaga, Rancho Polas Verdes, CA (US)

(73) Assignee: Blue Pumpkin Software, Inc., Sunnyvale, CA (US)

( * ) Notice: Subject to any disclaimer, the term of this patent is extended or adjusted under 35 U.S.C. 154(b) by 861 days.

(21) Appl. No.: 09/846,016

(22) Filed: Apr. 30, 2001

(65) Prior Publication Data

US 2003/0009520 A1 Jan. 9, 2003

(51) Int. Cl.[7] ............................................. G06F 15/173
(52) U.S. Cl. ...................... 709/226; 709/225; 709/229; 718/102; 718/103; 718/104; 718/105
(58) Field of Search ................................ 709/225, 226, 709/229; 718/102, 103, 104, 105

(56) References Cited

U.S. PATENT DOCUMENTS

| 4,510,351 A | 4/1985 | Costello et al. ................ 179/27 |
| 5,111,391 A | 5/1992 | Fields et al. ................. 364/401 |
| 5,185,780 A | 2/1993 | Leggett ........................ 379/34 |

(Continued)

FOREIGN PATENT DOCUMENTS

| EP | 0 817 455 A2 | 1/1998 | |
| EP | 0 863 650 A2 | 9/1998 | |
| EP | 0 863 651 A2 | 9/1998 | |
| EP | 1 039 732 A2 | 9/2000 | |
| EP | 1 056 264 A2 | 11/2000 | |
| EP | 1 162 814 A2 | 12/2001 | |
| GB | 2 339 643 A | 2/2000 | |
| WO | WO 00/08556 A1 | 2/2000 | |
| WO | WO 00/08556 | 2/2000 | ............. G06F/9/44 |

OTHER PUBLICATIONS

Dennis Cox, "Handling Multi-Media Work"; A Pipkins White Paper; www.pipkins.com; Mar. 12, 2001; pp. 1–3.

(Continued)

*Primary Examiner*—Saleh Najjar
(74) *Attorney, Agent, or Firm*—Shemwell Gregory & Courtney LLP

(57) ABSTRACT

A method and apparatus for generating an agent schedule for a multi-contact center that has immediate queues and deferred queues. In one embodiment, a method includes scheduling software receiving a plurality of scheduling data from a user interface, and the scheduling software generating a plurality of scheduling constraints. The method further includes a search engine using the plurality of scheduling constraints to generate a plurality of potential schedules including first potential schedules for immediate queues, and second potential schedules for deferred queues. The method further includes performing a first analysis on the first potential schedules to generate first estimated service levels, and performing a second analysis on the second potential schedules to generate second estimated service levels, wherein the first estimated service levels and the second estimated service levels are expressed in interchangeable units.

54 Claims, 4 Drawing Sheets

U.S. PATENT DOCUMENTS

| | | | |
|---|---|---|---|
| 5,195,172 A | 3/1993 | Elad et al. | 395/50 |
| 5,289,368 A | 2/1994 | Jordan et al. | 364/401 |
| 5,325,292 A | 6/1994 | Crockett | 364/401 |
| 5,369,570 A | 11/1994 | Parad | 364/401 |
| 5,477,447 A | 12/1995 | Luciw et al. | 364/419.08 |
| 5,481,667 A | 1/1996 | Bieniek et al. | 395/161 |
| 5,659,768 A | 8/1997 | Forbes et al. | |
| 5,917,485 A | 6/1999 | Spellman et al. | 345/336 |
| 6,021,403 A | 2/2000 | Horvitz et al. | 706/45 |
| 6,021,428 A | 2/2000 | Miloslavsky | |
| 6,044,355 A | 3/2000 | Crockett et al. | 705/8 |
| 6,081,592 A | 6/2000 | Battle | |
| 6,130,942 A | 10/2000 | Stenlund | |
| 6,134,530 A | 10/2000 | Bunting et al. | |
| 6,389,132 B1 * | 5/2002 | Price | 379/265.01 |
| 6,449,646 B1 * | 9/2002 | Sikora et al. | 709/226 |
| 6,581,105 B2 * | 6/2003 | Miloslavsky et al. | 709/238 |
| 6,661,889 B1 * | 12/2003 | Flockhart et al. | 379/265.05 |
| 6,665,395 B1 * | 12/2003 | Busey et al. | 379/265.09 |
| 6,744,877 B1 * | 6/2004 | Edwards | 379/265.02 |
| 6,771,764 B1 * | 8/2004 | Dezonno | 379/265.02 |

OTHER PUBLICATIONS

Pipkins, Inc.; SkillSense™ Scheduling; www.pipkins.com; Mar. 12, 2001; pp. 1–2.

Pipkins, Inc.; Merlang® Algorithms; www.pipkins.com; Mar. 12, 2001; pp. 1–2.

Dennis Cox; Skill Based Routing vs. Skill Set Scheduling; A Pipkins White Paper; www.pipkins.com; Mar. 12, 2001; pp. 1–6.

Pipkins, Inc.; "Skill Set Scheduling"; www.pipkins.com; Mar. 12, 2001; pp. 1–4.

Institute of Electronic et al: "Performance modelling of automatic call distributors: assignable grade of service staffing". Proceedings of the International Switching Symposium. Yokohama, Oct. 25–30, 1992. Tokyo. IEICE. JP. vol. 2 Symp. 14. Oct. 25, 1992, pp. 294–298 XP000337733.

Jackson et al: "Queues with dynamic priority discipline". Management Science, Institute of Management Science, Providence, RI, US. vol. 8 No. 1, 1961, pp. 18–34. XP002091801. ISSN: 0025–1909.

Kleinrock et al: "Queueing systems vol. 55–68 II: computer applications". Queueing Systems, J.C. Baltzer AG, Basel, CH, 1976, pp. 106–155. XP002091802. ISSN: 0257–0130.

* cited by examiner

METHOD AND APPARATUS FOR MULTI-CONTACT SCHEDULING

FIELD OF THE INVENTION

The invention is in the field of generating complex schedules in dynamic environments, such as multi-contact centers.

BACKGROUND

Generating schedules for employees is a complex problem for enterprises. Telephone call center scheduling is an example of a scheduling problem with a large number of variables. Variables include contact volume at a particular time of day, available staff, skills of various staff members, call type (e.g., new order call and customer service call), and number of call queues, where a queue may be assigned a particular call type. A basic goal of call center scheduling is to minimize the cost of operators, or agents, available to answer calls while maximizing service. Quality of service, or service level, can be quantified in various ways. One common metric for call service level is the percentage of incoming calls answered in a predetermined time, e.g. thirty seconds. The call center may receive calls of various types that are assigned to respective call queues.

Traditionally, call center scheduling is performed by first forecasting incoming contact volumes and estimating average talk times for each time period t (based on past history and other measures). The forecast is based upon historical data. Next, a closed-form formula known as reverse Erlang-C is used to compute full-time equivalent (FTE) agent requirement to provide a desired service level for each time period t. Such a method is described in Elementary Queuing Theory and Telephone Traffic, by Petr Beckmann, 1977, and in Lee's ABC of the Telephone Training Manuals, Geneva, IL. After the FTE agent requirement are computed, the required number of agents is scheduled for each time period t.

At a call center, calls of different types are typically placed onto different queues by an Automatic Call Distributor (ACD). The calls wait at the ACD for an operator to answer them. The ACD is typically for handling telephone calls. Different types of calls are assigned to different call queues. Typically, not all agents have the same skills, and thus some agents can answer some calls while other agents cannot. Scheduling for varying agent skill sets is the skill-based scheduling problem. The skill-based scheduling problem is considerably more difficult than the basic call center scheduling problem because of all the interactions between queues. Typical approaches to solving the skill-based scheduling problem involve variations on an Erlang formula. The Erlang formulas are useful for computing staffing requirements for telephone contacts where the average contact volume is high, service level requirements are stringent, the task of answering a telephone call is not interruptible, and an agent can only answer one telephone call at a given time. Service level is expressed as a percentage of incoming calls that can be answered in within a maximum time limit. An example of stringent service levels is 80%–90% of incoming calls to be answered within 20–60 seconds.

In the past few years, however, call centers have evolved into "contact centers" in which the agent's contact with the customer can be through many contact media. For example, a multi-contact call center may handle telephone, email, web callback, web chat, fax, and voice over internet protocol (IP). Therefore, in addition to variation in the types of calls (e.g., service call, order call), modern contact centers have the complication of variation in contact media. The variation in contact media adds complexity to the agent scheduling process. For example, one of the ways in which contact media can vary markedly is in time allowed for response to the contact. Telephone calls are typically expected to be answered when they are received, or in "real-time". If a caller does not receive a real-time answer in a fairly short time, the caller hangs up, abandoning the call. If a contact is by email or fax, on the other hand, the customer does not expect a real-time response. Therefore response times for various contact media vary from seconds to days.

Call centers have traditionally had to respond immediately to their telephone customers, and therefore the incoming telephone call queues are called on-line queues. In multi-contact call centers, however, an agent may be required to respond to incoming customer contacts from other queues, such as e-mail and faxed requests, in addition to responding to customer contacts from "immediate" queues, such as telephone calls and computer chats. Email and fax contact do not require immediate responses, but can be deferred. As with traditional telephone call centers, agents can only answer the types of calls for which they have the appropriate training and/or experience. Because all agents must be scheduled across immediate and deferred queues, in addition to all of the traditional scheduling constraints, the multi-contact scheduling problem is considerably complex.

Common techniques for scheduling staff in contact centers that have both immediate and deferred queues are inadequate. For example, in typical scheduling techniques, immediate queues are dealt with in terms of immediate performance measures such as average time to answer and service level. Deferred queues are considered only secondarily. Deferred queues are often simply scheduled into the day during lulls in on-line queue demand. No consideration is given to a projected or expected performance of deferred queues.

There are currently no known methods for effectively computing staffing requirements for e-mail, chat, Web callback, and other new media given certain service level requirements and contact arrival rates. Erlang formulas cannot be used because off-line contact media do not conform to Erlang's queuing theory models. Some of the aspects of deferred contacts that do not conform with Erlang models include the interruptibility of tasks, the fact that multiple contacts may be handled simultaneously, and the fact that service levels can be in hours or days, rather than seconds. This limits the effectiveness of the multi-contact center because there is no common performance measure for immediate and deferred queues, and thus no way to assess possible trade-offs between assigning agents to immediate queues versus deferred e queues. Another disadvantage of current scheduling methods that a call center manager cannot visualize queue performance in a type-independent manner and therefore must make adjustments to the schedule without the benefit of data to direct the adjustments.

SUMMARY OF THE DISCLOSURE

A method and apparatus for multi-contact scheduling is described. Embodiments of the invention can be used with existing scheduling software to produce agent schedules for contact centers that handle on-line "immediate" and off-line "deferred" contact queues. One embodiment includes scheduling software receiving a scheduling data from a user interface, and the scheduling software generating scheduling constraints. A search engine uses the scheduling constraints to generate potential schedules, including potential schedules for immediate queues, and potential schedules for deferred queues. An analysis is performed on the potential schedules for the immediate queues. The analysis for the immediate queues can be preformed using existing analysis tools. In addition, an analysis is performed on the potential schedules for the deferred queues. The analyses produce estimated service levels expressed in interchangeable units. The immediate and deferred queues can thus be commonly assessed, allowing the choice of a schedule that is optimized both for immediate queues and deferred queues.

DETAILED DESCRIPTION

A method and apparatus for multi-contact scheduling is described. Embodiments of the invention allow scheduling of immediate contact queues and deferred contact queues for a contact center. Potential agent schedules are analyzed and estimated service levels are generated for both immediate queues and deferred queues in common units. An optimized schedule that takes into account all types of contacts can thus be generated.

Figure 1:
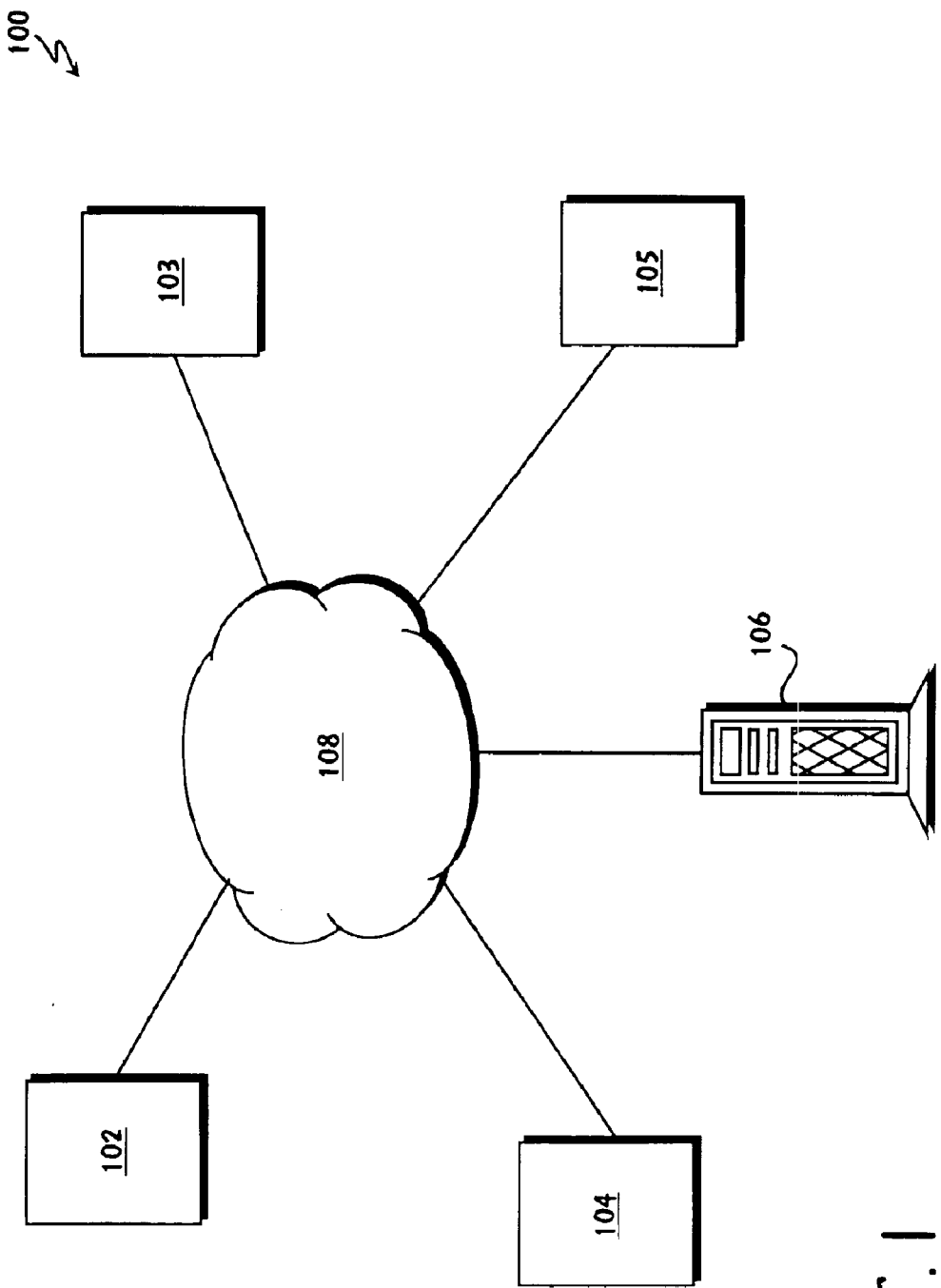
FIG. 1 is a block diagram of an embodiment of a system for multi-contact schedule generation.

FIG. 1 is an embodiment of a system 100 for generating complex schedules. The system includes multiple client computers 102–105, which are coupled to the server 106 through a network 108. The network 108 can be any network, such as a local area network, a wide area network, or the Internet. The client computers each include one or more processors and one or more storage devices. Each of the client computers also includes a display device, and one or more input devices. The server 106 includes one or more storage devices. All of the storage devices store various data and software programs. In one embodiment, methods for generating complex schedules are carried out on the system 100 by software instructions executing on one or more of the client computers 102–105. The software instructions may be stored on the server 106 or on any one of the client computers. For example, one embodiment is a hosted application used by a call center of an enterprise that requires complex scheduling of many employees, or agents. The software instructions are stored on the server and accessed through the network by a client computer operated by the enterprise. In other embodiments, the software instructions may be stored and executed on the client computer. Data required for the execution of the software instructions can be entered by a user of the client computer through a specialized user interface. Data required for the execution of the software instructions can also be accessed via the network and can be stored anywhere on the network.

One example of a complex schedule is an agent schedule for a multi-contact center, or contact center. A contact center is an organization that responds to incoming contacts from customers of an enterprise. The incoming contacts are via any one of a number of contact media, such as telephone calls, email, fax, web chat, voice over internet protocol, and call backs. An agent is an employee that is trained to respond to various contacts according to both the content and the medium of the contact. Each agent can have a different skill set. For example, one agent may be trained to answer live telephone help inquiries regarding certain products, respond to email regarding certain products, receive telephone purchase orders for certain products, etc. Typically, incoming contacts are assigned to different queues based upon the content and/or medium of the contact. In embodiments of the invention, contact queues are divided into at least two types of queues. One type of queue is an immediate queue for contacts that can be abandoned and should be responded to in real-time, such as telephone calls. Another type of queue is a deferred queue for contacts that cannot be abandoned (at least not immediately) and should be responded to within some time period after receipt, such as email or fax.

An agent may be assigned to multiple contact queues within a time period. A contact queue typically handles one type of contact requiring a particular skill or skills. The possible number of skill sets includes every permutation of combinations of the existing skills in the organization. Each agent has a particular skill set, but the skill sets among different agents may overlap. In embodiments of the invention, as described more fully below, a user who is performing scheduling can produce a schedule that most efficiently uses available agents across contact media, taking into account the widely varying acceptable response times of different contact media. For example, telephone calls must be responded to in seconds, while fax contacts may be responded to in some number of days.

Traditionally there are two important measures for immediate queue performance. One measure is percentage of calls answered, or PCA, which represents the service level provided by the queue. The other measure is based upon the number of agents servicing a queue (agents available) and the number of agents required on the queue (agents required) in order to meet service level goals. Embodiments of the invention estimate values of PCA, agents available, and agents required for deferred queues using discrete mathematical analysis as further described below. Any other performance measures may be used in various embodiments, such as average speed to answer. Embodiments of the invention present the performance measures for immediate and deferred queues in an identical way, which facilitates visualization of potential schedules and human decision-making.

Figure 2:
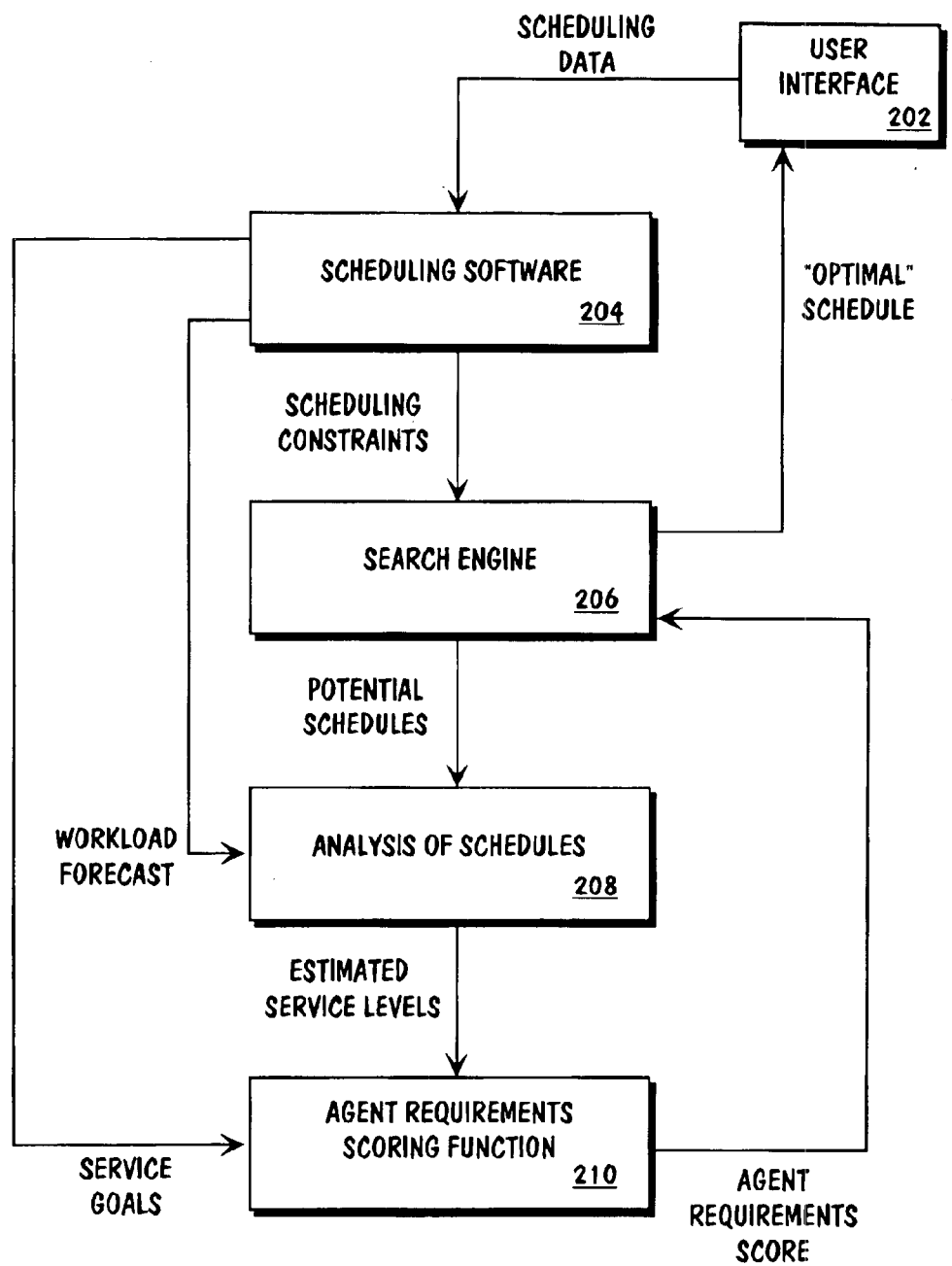
FIG. 2 is a simplified flow diagram of an embodiment of schedule generation, including an a schedule analysis adapted to deferred queues.

FIG. 2 is a simplified flow diagram of an embodiment of schedule generation that is capable of analyzing deferred queue performance and representing that performance using the same measures traditionally used for immediate queues. At 202, a user enters scheduling data via a user interface that is specifically designed for the agent scheduling process. The scheduling data applies to a schedule period that includes multiple intervals of predetermined length. For example, the scheduling period can be one day with intervals of one half-hour. The scheduling data includes the type of contact media, the expected contact volume, the expected contact handle times, service goals, agent designations, and work rules. Some of the data, such as expected contact handle times, is derived from historical data. In one embodiment, the scheduling data includes data for deferred queues. In other embodiments, the scheduling data includes data for immediate and deferred queues.

At 204, scheduling software receives the scheduling data. The scheduling software is an existing tool for analyzing the scheduling data and generating scheduling constraints, including workload forecasts and service goals. The scheduling constraints are sent to a search engine at 206. The search engine generates potential schedules for analysis. At 208, analysis of schedules for deferred queues is performed to produce estimated service levels for the deferred queues according to the potential schedule that was analyzed. The analysis of 208 is performed using a forward-push discrete event modeler which estimates PCA for deferred queues given the workload and capacity in any given interval within the schedule period. PCA for deferred queues is used by the agent requirement scoring function at 210, along with service goals, to produce an agent requirement score. The analysis of 208 will be described more fully with reference to FIG. 4. The agent requirement score is used by the search engine 206 to evaluate the schedule. A schedule with the highest agent requirement score of all of the analyzed schedules is output as an "optimal" schedule to the user interface 202. The flow of FIG. 2 produces an optimal schedule, including optimal schedules for deferred queues as measured by traditional metrics used for immediate queues.

In another embodiment, which will now be described with reference to the flow diagram of FIG. 3, optimal schedules for both immediate and deferred queues are produced in one embodiment, and each type of queue is analyzed separately. One analysis is used for deferred queues, and another analysis is used for immediate queues. At 302, the user enters scheduling data via a user interface. The scheduling data is similar to that described with reference to FIG. 2. The scheduling data applies to both immediate queues and deferred queues. The scheduling software, at 304, uses the scheduling data to generate scheduling constraints, workload forecast for both immediate queues and deferred queues, and service goals for all queues. At 306, the search engine uses the scheduling constraints to generate potential schedules for both immediate queues and deferred queues. In one embodiment, a single schedule including both types of queues is received by the deferred queue analysis at 308, and by the immediate queue analysis at 310. The deferred queue analysis generates estimated service levels for queues as described with reference to FIG. 2. The immediate queue analysis generates estimated service levels according to conventional techniques such as Erlang-based analysis. The estimated service levels for the immediate queues and deferred queues are in the same or interchangeable units, so that both types of queues are scored together by the agent requirement scoring function at 312. This generates a score that reflects the effectiveness of the potential schedule in utilizing all of the available agents, with their varying skill sets, across different contact queues. An agent requirement score is received by the search engine 306, which designates an optimal schedule. In one embodiment, a schedule is evaluated for each queue in the schedule. For example, each queue will have potentially different agents available and agents required. If some of the queues are deferred, and some are immediate, the methods for calculating the agent requirements and agents available are different for the two types of queues. All of the agent requirements and agents available are combined into one score, however, so that the order or method of queue evaluation is irrelevant. The optimal schedule is the schedule with the best agent requirement score of all of the potential schedules analyzed. The optimal schedule is output to the user via the interface 302.

Figure 3:
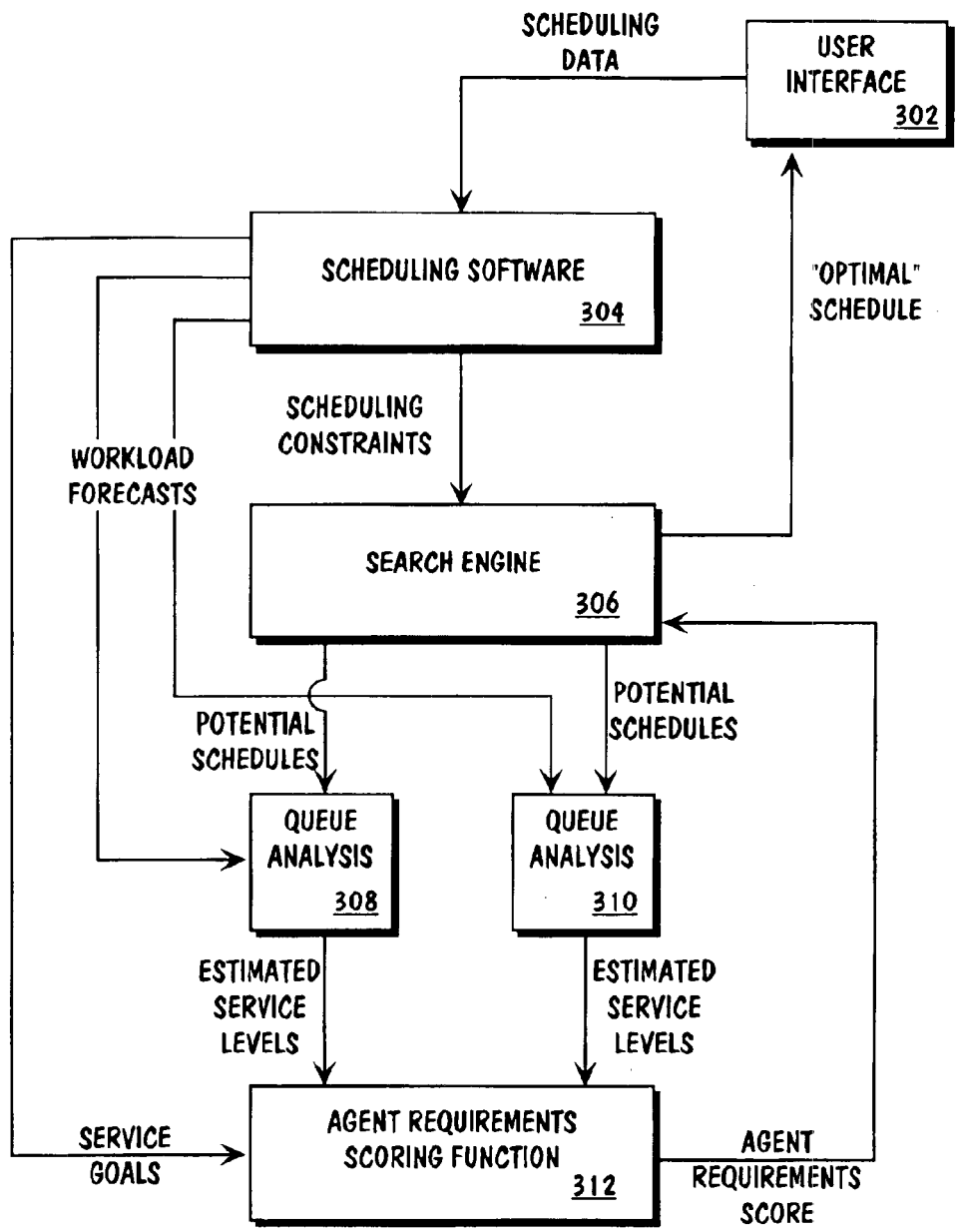
FIG. 3 is a simplified flow diagram of an embodiment of schedule generation for immediate and deferred queues.

In one embodiment, the queue analysis designated by 208 in FIG. 2 and by 308 in FIG. 3 is a forward push discrete event modeler. The forward push discrete event modeler will be described with reference to Table 1 through Table 3. In each interval, workload is computed by multiplying the forecast contact volume with the forecast average handling time. Capacity is computed by multiplying the number of available agents with the number of seconds in the interval in which they will work on a particular queue. If agents are capable of working on multiple queues in the same time interval, the time they spend on each of the queues is determined by static analysis or occasional explicit simulation of contact arrivals.

Referencing Table 1, the forward push modeler iterates over all intervals starting with the earliest interval and subtracts the capacity from the first interval's workload until all of the first interval's workload is completed. Next, the forward push modeler starts with the second earliest interval and subtracts the capacity from the second interval's workload until all of the second interval's workload is completed. This continues until all of the capacity is used or all of the workload is completed.

TABLE 1

| Initially: | | | | | | |
|---|---|---|---|---|---|---|
| Interval | 1 | 2 | 3 | 4 | 5 | 6 |
| Workload | 100 | 100 | 100 | 0 | 0 | 0 |
| Capacity | 40 | 40 | 40 | 40 | 40 | 40 |
| After the 1st Iteration: | | | | | | |
| Interval | 1 | 2 | 3 | 4 | 5 | 6 |
| Workload | 0 | 100 | 100 | 0 | 0 | 0 |
| Capacity | 0 | 0 | 20 | 40 | 40 | 40 |
| After the 2nd Iteration: | | | | | | |
| Interval | 1 | 2 | 3 | 4 | 5 | 6 |
| Workload | 0 | 0 | 100 | 0 | 0 | 0 |
| Capacity | 0 | 0 | 0 | 0 | 0 | 40 |
| After the 3rd. (Final) Iteration | | | | | | |
| Interval | 1 | 2 | 3 | 4 | 5 | 6 |
| Workload | 0 | 0 | 60 | 0 | 0 | 0 |
| Capacity | 0 | 0 | 0 | 0 | 0 | 0 |

Referencing Table 2, the forward push modeler returns an approximate percentage workload completed within that service time by evaluating the workload remaining (if any) once the number of intervals in the service goal time has elapsed. The percentage workload completed is interchangeable with the traditional measure of PCA, and will be referred to as PCA herein. In Table 2, the service goal time is two intervals. The average speed to answer (ASA) is computed by doing a weighted average of the amounts of workload completed in various intervals and the time elapsed. Interval 1 in Table 2 would have a PCA of 80% because 80 seconds of workload out of 100 seconds were completed within two intervals. In various embodiments, other performance measure than PCA can be determined.

TABLE 2

| | Service Goal Time = 2 Intervals | | | | | |
|---|---|---|---|---|---|---|
| Interval (Initial) | 1 | 2 | 3 | 4 | 5 | 6 |
| Workload | 100 | 100 | 100 | 0 | 0 | 0 |
| Capacity | 40 | 40 | 40 | 40 | 40 | 40 |

TABLE 2-continued

| | Service Goal Time = 2 Intervals | | | | | |
|---|---|---|---|---|---|---|
| Interval (Initial) | 1 | 2 | 3 | 4 | 5 | 6 |
| (Remaining) Workload | 0 | 0 | 60 | 0 | 0 | 0 |
| Capacity | 0 | 0 | 0 | 0 | 0 | 0 |
| PCA | 80% | 20% | 0% | — | | |

Agents available and agents required are computed from the results of the forward push modeler such that the trade-offs with immediate queues that typically have explicit agent requirement can be computed and compared. Agent requirement is calculated by multiplying the workload and the required service goal percentage. Agents available is calculated by multiplying the workload and the PCA and adding the remaining capacity, of there is any. If agent requirement is greater than agents available, then the contact center is understaffed. If agents available is greater than agent requirement, then the contact center is overstaffed. Put another way, PCA exceeds required service goal percentage, or there is unused capacity. With reference to Table 3, the example above, the required service goal percentage is 70 and the service goal time is two intervals. The agent requirement and agents available are shown for each interval in the schedule period.

TABLE 3

| | Required Service Goal Percent = 70% Service Goal Time = 2 Intervals | | | | | |
|---|---|---|---|---|---|---|
| Interval (Initial) | 1 | 2 | 3 | 4 | 5 | 6 |
| Workload | 100 | 100 | 100 | 0 | 0 | 0 |
| Capacity | 40 | 40 | 40 | 40 | 40 | 40 |
| (Remaining) | | | | | | |
| Workload | 0 | 0 | 60 | 0 | 0 | 0 |
| Capacity | 0 | 0 | 0 | 0 | 0 | 0 |
| PCA | 80% | 20% | 0% | — | — | — |
| Required | 70 | 70 | 70 | 0 | 0 | 0 |
| Available | 80 | 20 | 0 | — | — | — |

Figure 4:
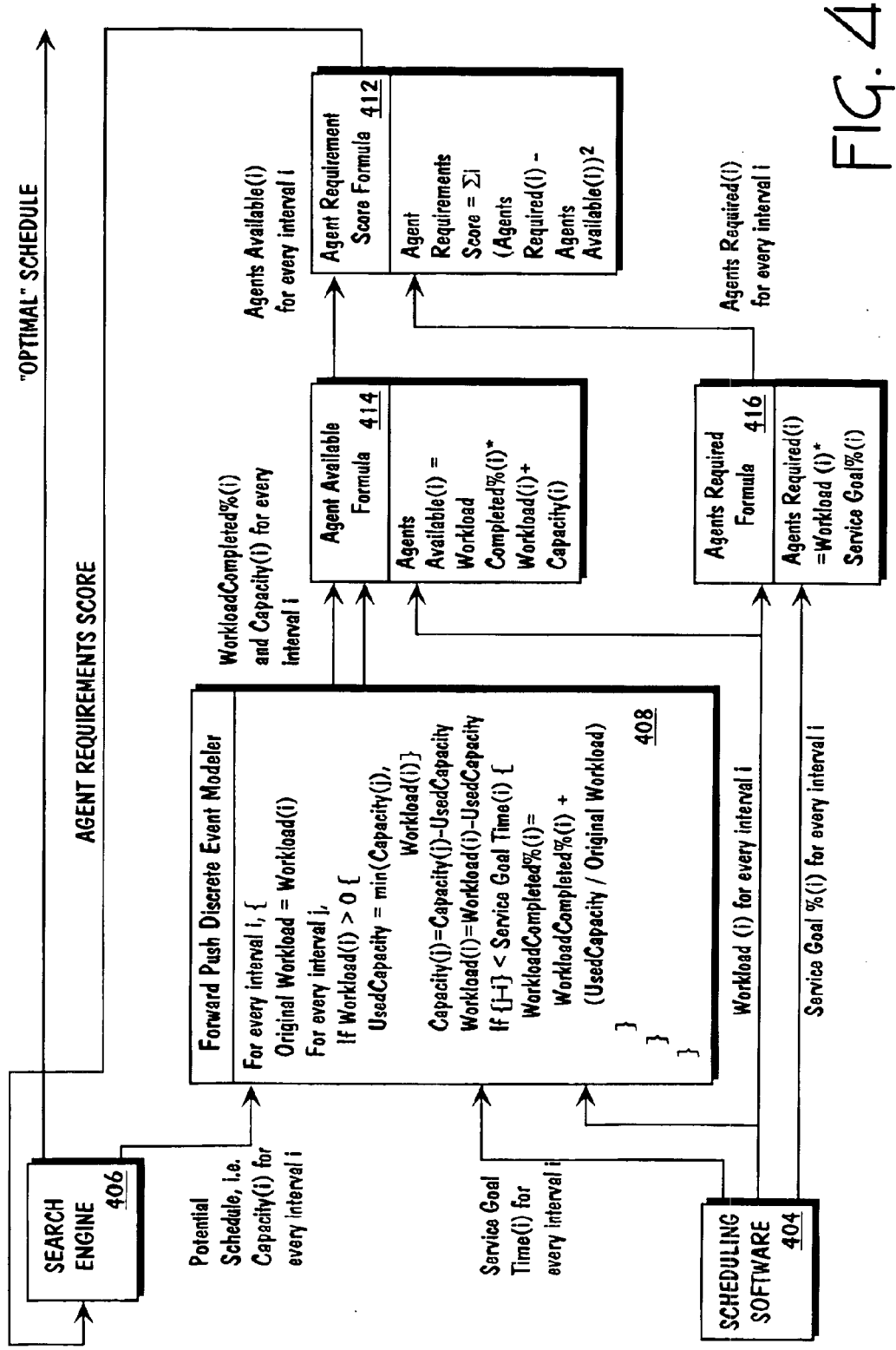
FIG. 4 is a more detailed flow diagram of an embodiment of a schedule analysis adapted to deferred queues.

FIG. 4 is a more detailed flow diagram showing the generation of an agent requirement score for deferred queues. The deferred queue analysis 408 is a forward push discrete event modeler. The forward push discrete event modeler 408 receives a potential schedule from the search engine 406. The potential schedule includes capacity for every interval in the schedule period. The forward push discrete event modeler 408 also receives a service goal expressed as time for every interval in the schedule period and a workload for every interval in the schedule period. The forward push event modeler iterates as shown at 408 and as previously described. The agents available formula 414 receives a workload completed percentage for every interval in the schedule period and a capacity for every interval in the schedule period. The agents available formula 414 also receives an agents required figure for every interval which is generated by the agents required formula 416. The agents available formula generates an agents available figure for every interval.

The agents required formula generates the agents required figure from the workload for every interval and the service goal for every interval. The agent requirement score formula 412 receives the agents available figure and the agents required figure and outputs an agent requirement score for the schedule period.

The invention has been described with reference to specific embodiments and examples. The scope of the invention is defined by the claims, and includes modifications that may be made by one of ordinary skill in the art.

What is claimed is:

1. A method for generating an agent schedule for a multi-contact center, wherein the multi-contact center processes a plurality of contact queues, comprising immediate contact queues and deferred contact queues, the method comprising:

scheduling software receiving a plurality of scheduling data from a user interface;

the scheduling software generating a plurality of scheduling constraints;

a search engine using the plurality of scheduling constraints to generate a plurality of potential schedules comprising at least one potential schedule for each of the plurality of contact queues, including first potential schedules for immediate queues, and second potential schedules for deferred queues;

performing a first analysis on the first potential schedules to generate first estimated service levels; and performing a second analysis on the second potential schedules to generate second estimated service levels, wherein the first estimated service levels and the second estimated service levels are expressed in interchangeable units.

2. The method of claim 1, further comprising generating an agent requirement score using the first estimated service levels, the second estimated service levels, and at least one of the plurality of scheduling constraints.

3. The method of claim 2, further comprising:

the search engine using the agent requirement score to determine whether a potential schedule is acceptable, wherein an acceptable potential schedule has a best agent requirement score of the plurality of potential schedules; and if the potential schedule is acceptable, outputting the potential schedule to the user interface.

4. The method of claim 1, wherein the plurality of scheduling data comprises:

at least one contact type, comprising telephone calls, email; fax, web chat, voice over internet protocol, and call backs;

at least one forecast contact volume;

at least one forecast contact handling time;

at least one service goal;

at least one agent designation; and at least one work rule.

5. The method of claim 1, wherein the plurality of scheduling constraints comprises:

a service goal time for each interval in a multi-interval schedule period;

a workload for each interval in the multi-interval schedule period; and a service goal percentage each interval in the multi-interval schedule period.

6. The method of claim 1, wherein immediate contacts include telephone calls, and wherein deferred contacts include email, and fax.

7. The method of claim 1, wherein the interchangeable units are percentage of workload complete, wherein workload is a total workload in a multi-interval schedule period.

8. The method of claim 5, wherein the second analysis comprises generating the second estimated service levels using a workload for each interval in a multi-interval schedule period, and a capacity for each interval in the multi-interval scheduling period.

9. The method of claim 8, wherein the workload is generated by multiplying a forecast contact volume with a forecast average contact handling time.

10. The method of claim 9, wherein the capacity for an interval is generated by multiplying a number of available agents with a number of seconds the number of available agent work on a queue.

11. The method of claim 10, wherein at least one of the number of available agents is capable of working on more than one queue, and wherein the number of seconds worked on the queue is determined by static analysis.

12. The method of claim 10, wherein at least one of the number of available agents is capable of working on more than one queue, and wherein the number of seconds worked on the queue is determined by periodically simulating contact arrivals.

13. The method of claim 10, wherein the second analysis further comprises iterating over successive intervals in the multi-interval schedule period in chronological order until a total capacity for the multi-interval schedule period is used or a total workload for the multi-interval schedule period is completed, wherein iterating comprises:
applying a capacity for a first interval to a workload of the first interval; and
if the workload of the first interval is not completed by the capacity for the first interval, applying a capacity for a subsequent interval to the workload of the first interval.

14. The method of claim 13, wherein the second analysis further comprises evaluating a workload remaining after a total number of intervals in a service goal time has elapsed.

15. A system for generating a schedule for a plurality of agents in a multi-contact center, wherein the multi-contact center processes a plurality of contact queues, comprising immediate contact queues and deferred contact queues, the system comprising:
at least one server comprising at least one storage device;
at least one client processor coupled to the server through a network, wherein the client processor is coupled to a plurality of storage devices, including a storage device that stores instructions that, when executed, cause the at least one client processor to,
receive a plurality of scheduling data from a user interface;
generate a plurality of scheduling constraints;
use the plurality of scheduling constraints to generate a plurality of potential schedules comprising at least one potential schedule for each of the plurality of contact queues, including first potential schedules for immediate queues, and second potential schedules for deferred queues;
perform a first analysis on the first potential schedules to generate first estimated service levels; and
perform a second analysis on the second potential schedules to generate second estimated service levels, wherein the first estimated service levels and the second estimated service levels are expressed in interchangeable units.

16. The system of claim 15, wherein the storage device that stores the instructions is accessed by the at least one processor through the network.

17. The system of claim 15, wherein the storage device that stores the instructions is the at least one storage device of the server.

18. The system of claim 15, wherein the stored instructions, when executed, further cause the at least one client processor to generate an agent requirement score using the first estimated service levels, the second estimated service levels, and at least one of the plurality of scheduling constraints.

19. The system of claim 16, wherein the stored instructions, when executed, further cause the at least one client processor to:
use the agent requirement score to determine whether a potential schedule is acceptable, wherein an acceptable potential schedule has a best agent requirement score of the plurality of potential schedules; and
if the potential schedule is acceptable, output the potential schedule to the user interface.

20. The system of claim 15, wherein the plurality of scheduling data comprises:
at least one contact type, comprising telephone calls, email; fax, web chat, voice over internet protocol, and call backs;
at least one forecast contact volume;
at least one forecast contact handling time;
at least one service goal;
at least one agent designation; and
at least one work rule.

21. The system of claim 15, wherein the plurality of scheduling constraints comprises:
a service goal time for each interval in a multi-interval schedule period;
a workload for each interval in the multi-interval schedule period; and
a service goal percentage each interval in the multi-interval schedule period.

22. The system of claim 15, wherein immediate contacts include telephone calls, and wherein deferred contacts include email, and fax.

23. The system of claim 15, wherein the interchangeable units are percentage of workload complete, wherein workload is a total workload in a multi-interval schedule period.

24. The system of claim 19, wherein the second analysis comprises generating the second estimated service levels using a workload for each interval in a multi-interval schedule period, and a capacity for each interval in the multi-interval scheduling period.

25. The system of claim 22, wherein the workload is generated by multiplying a forecast contact volume with a forecast average contact handling time.

26. The system of claim 23, wherein the capacity for an interval is generated by multiplying a number of available agents with a number of seconds the number of available agent work on a queue.

27. The system of claim 24, wherein at least one of the number of available agents is capable of working on more than one queue, and wherein the number of seconds worked on the queue is determined by static analysis.

28. The system of claim 24, wherein at least one of the number of available agents is capable of working on more than one queue, and wherein the number of seconds worked on the queue is determined by periodically simulating contact arrivals.

29. The system of claim 24, wherein the second analysis further comprises iterating over successive intervals in the multi-interval schedule period in chronological order until a total capacity for the multi-interval schedule period is used or a total workload for the multi-interval schedule period is completed, wherein iterating comprises:

applying a capacity for a first interval to a workload of the first interval; and if the workload of the first interval is not completed by the capacity for the first interval, applying a capacity for a subsequent interval to the workload of the first interval.

30. The system of claim 17, wherein the second analysis further comprises evaluating a workload remaining after a total number of intervals in a service goal time has elapsed.

31. An electromagnetic medium containing executable instructions which, when executed in a processing system, cause the system to generate a schedule for a plurality of agents in a multi-contact center, wherein generating the schedule comprises:

scheduling software receiving a plurality of scheduling data from a user interface;

the scheduling software generating a plurality of scheduling constraints;

a search engine using the plurality of scheduling constraints to generate a plurality of potential schedules comprising at least one potential schedule for each of the plurality of contact queues, including first potential schedules for immediate queues, and second potential schedules for deferred queues;

performing a first analysis on the first potential schedules to generate first estimated service levels; and performing a second analysis on the second potential schedules to generate second estimated service levels, wherein the first estimated service levels and the second estimated service levels are expressed in interchangeable units.

32. The electromagnetic medium of claim 31, wherein generating the schedule further comprises generating an agent requirement score using the first estimated service levels, the second estimated service levels, and at least one of the plurality of scheduling constraints.

33. The electromagnetic medium of claim 32, wherein generating the schedule further comprises:

the search engine using the agent requirement score to determine whether a potential schedule is acceptable, wherein an acceptable potential schedule has a best agent requirement score of the plurality of potential schedules; and if the potential schedule is acceptable, outputting the potential schedule to the user interface.

34. The electromagnetic medium of claim 31, wherein generating the schedule further comprises:

at least one contact type, comprising telephone calls, email; fax, web chat, voice over internet protocol, and call backs;

at least one forecast contact volume;

at least one forecast contact handling time;

at least one service goal;

at least one agent designation; and at least one work rule.

35. The electromagnetic medium of claim 31, wherein generating the schedule further comprises:

a service goal time for each interval in a multi-interval schedule period;

a workload for each interval in the multi-interval schedule period; and a service goal percentage each interval in the multi-interval schedule period.

36. The electromagnetic medium of claim 31, wherein immediate contacts include telephone calls, and wherein deferred contacts include email, and fax.

37. The electromagnetic medium of claim 31, wherein the interchangeable units are percentage of workload complete, wherein workload is a total workload in a multi-interval schedule period.

38. The electromagnetic medium of claim 35, wherein the second analysis comprises generating the second estimated service levels using a workload for each interval in a multi-interval schedule period, and a capacity for each interval in the multi-interval scheduling period.

39. The electromagnetic medium of claim 38, wherein the workload is generated by multiplying a forecast contact volume with a forecast average contact handling time.

40. The electromagnetic medium of claim 39, wherein the capacity for an interval is generated by multiplying a number of available agents with a number of seconds the number of available agent work on a queue.

41. The electromagnetic medium of claim 40, wherein at least one of the number of available agents is capable of working on more than one queue, and wherein the number of seconds worked on the queue is determined by static analysis.

42. The electromagnetic medium of claim 40, wherein at least one of the number of available agents is capable of working on more than one queue, and wherein the number of seconds worked on the queue is determined by periodically simulating contact arrivals.

43. The electromagnetic medium of claim 40, wherein the second analysis further comprises iterating over successive intervals in the multi-interval schedule period in chronological order until a total capacity for the multi-interval schedule period is used or a total workload for the multi-interval schedule period is completed, wherein iterating comprises:

applying a capacity for a first interval to a workload of the first interval; and if the workload of the first interval is not completed by the capacity for the first interval, applying a capacity for a subsequent interval to the workload of the first interval.

44. The electromagnetic medium of claim 43, wherein the second analysis further comprises evaluating a workload remaining after a total number of intervals in a service goal time has elapsed.

45. A method for generating an agent schedule for a multi-contact center, wherein the multi-contact center processes a plurality of contact queues, comprising immediate contact queues and deferred contact queues, the method comprising:

scheduling software receiving a plurality of scheduling data from a user interface, wherein the scheduling data includes data regarding immediate contact queues and deferred contact queues;

the scheduling software generating a plurality of scheduling constraints;

a search engine using the plurality of scheduling constraints to generate a plurality of potential schedules comprising at least one potential schedule for each of the plurality of contact queues;

performing an analysis on the at least one potential schedule to generate estimated service levels in common units for both the immediate contact queues and the deferred contact queues.

46. The method of claim 45, wherein the plurality of scheduling data comprises:

at least one contact type, comprising telephone calls, email; fax, web chat, voice over internet protocol, and call backs;

at least one forecast contact volume;
at least one forecast contact handling time;
at least one service goal;
at least one agent designation; and
at least one work rule.

47. The method of claim 45, wherein the plurality of scheduling constraints comprises:
   a service goal time for each interval in a multi-interval schedule period;
   a workload for each interval in the multi-interval schedule period; and
   a service goal percentage each interval in the multi-interval schedule period.

48. The method of claim 47, wherein the analysis comprises generating the estimated service levels using a workload for each interval in a multi-interval schedule period, and a capacity for each interval in the multi-interval scheduling period.

49. The method of claim 45, wherein the common units are percentage of workload complete, wherein workload is a total workload in a multi-interval schedule period.

50. The method of claim 47, wherein the analysis comprises generating the estimated service levels using a workload for each interval in a multi-interval schedule period, and a capacity for each interval in the multi-interval scheduling period.

51. The method of claim 48, wherein the workload is generated by multiplying a forecast contact volume with a forecast average contact handling time.

52. The method of claim 48, wherein the capacity for an interval is generated by multiplying a number of available agents with a number of seconds the number of available agent work on a queue.

53. The method of claim 52, wherein the analysis further comprises iterating over successive intervals in the multi-interval schedule period in chronological order until a total capacity for the multi-interval schedule period is used or a total workload for the multi-interval schedule period is completed, wherein iterating comprises:
   applying a capacity for a first interval to a workload of the first interval; and
   if the workload of the first interval is not completed by the capacity for the first interval, applying a capacity for a subsequent interval to the workload of the first interval.

54. The method of claim 53, wherein the analysis further comprises evaluating a workload remaining after a total number of intervals in a service goal time has elapsed.

* * * * *